United States Patent
Foley et al.

(10) Patent No.: US 12,311,716 B2
(45) Date of Patent: May 27, 2025

(54) COILOVER DAMPER WITH SEMI TRAILING ARM ON BODY ON FRAME VEHICLE

(71) Applicant: Ford Global Technologies, LLC, Dearborn, MI (US)

(72) Inventors: Shane Edward Foley, Livonia, MI (US); Jared Shroyer, Dearborn, MI (US); Peter Joseph Jargowsky, Canton, MI (US); Carl Montgomery, Madison Heights, MI (US); Jordi Vidauri Saiz, Mexico City (MX); Geoff Lawrence Gordon, Novi, MI (US); Brandon Bay, White Lake, MI (US); Michelle Darcy-Sharma, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

(21) Appl. No.: 17/717,225

(22) Filed: Apr. 11, 2022

(65) Prior Publication Data

US 2023/0322037 A1    Oct. 12, 2023

(51) Int. Cl.
*B60G 15/06* (2006.01)
*B60G 3/14* (2006.01)
(Continued)

(52) U.S. Cl.
CPC ............ *B60G 15/065* (2013.01); *B60G 3/14* (2013.01); *B60G 7/001* (2013.01); *B60G 7/008* (2013.01); *B60G 7/02* (2013.01); *B60G 7/04* (2013.01); *B60G 11/54* (2013.01); *B60G 13/00* (2013.01); *B60G 13/003* (2013.01); *B60G 13/005* (2013.01); *B60K 1/00* (2013.01);
(Continued)

(58) Field of Classification Search
CPC .... B60G 15/06; B60G 15/062; B60G 15/065; B60G 15/067; B60G 15/068; B60G 15/07; B60G 7/001; B60G 7/00; B60G 7/008; B60G 7/02; B60G 7/04; B60G 13/003; B60G 13/005; B60G 13/001; B60G 13/00; B60G 2200/1322; B60G 2200/132; B60G 2202/312; B60G 2204/128; B60G 2204/129; B60G 2204/4502; B60G 2204/125; B60G 2300/024; B60G 2300/50; B60G 3/14; B60G 3/145; B60G 3/225; B60G 11/54; B60G 11/56; B60K 1/00; B60K 2001/001
USPC .......................................... 280/124.1, 124.128
See application file for complete search history.

(56) References Cited

FOREIGN PATENT DOCUMENTS

| DE | 10258021 A1 * | 7/2004 | ............... B60G 3/14 |
| DE | 102019218641 A1 * | 6/2021 | ............. B60G 11/24 |
| JP | H0224209 A * | 1/1990 | |

* cited by examiner

*Primary Examiner* — Keith J Frisby
(74) *Attorney, Agent, or Firm* — Burr & Forman LLP; Lorne Forsythe (57) ABSTRACT

A vehicle suspension system may include a semi trailing arm, a coilover damper and a distributed jounce response assembly. The semi trailing arm may be operably coupled to a chassis of a battery electric vehicle (BEV) at a first pivotable connection and a second pivotable connection. The semi trailing arm may also support a rear wheel of the BEV. The coilover damper may be disposed between the chassis and a third pivotable connection on the semi trailing arm. The distributed jounce response assembly may progressively distribute a jounce load to at least two different locations within the system.

20 Claims, 11 Drawing Sheets

(51) Int. Cl.
  *B60G 7/00* (2006.01)
  *B60G 7/02* (2006.01)
  *B60G 7/04* (2006.01)
  *B60G 11/54* (2006.01)
  *B60G 13/00* (2006.01)
  *B60K 1/00* (2006.01)
(52) U.S. Cl.
  CPC ............... *B60G 2200/1322* (2013.01); *B60G 2204/125* (2013.01); *B60G 2204/128* (2013.01); *B60G 2204/129* (2013.01); *B60G 2204/4502* (2013.01); *B60G 2300/024* (2013.01); *B60G 2300/50* (2013.01)

COILOVER DAMPER WITH SEMI TRAILING ARM ON BODY ON FRAME VEHICLE

TECHNICAL FIELD

Example embodiments generally relate to vehicle suspension and, more particularly, relate to a suspension system that employs a combination of a coilover damper and a semi trailing arm (STA) for a body on frame vehicle.

BACKGROUND

Vehicles commonly employ different types of suspension based on target price and performance goals. Accordingly, given that certain vehicle types made by different manufacturers compete with each other in the marketplace, trends can develop whereby certain vehicle types tend to coalesce around using the same types of suspension. Thus, for example, many pickup trucks tend to employ traditional leaf springs and live rear axles for rear suspension instead of independent rear suspension.

All that being said, manufacturers may explore market differentiation avenues by employing a different suspension (or different other features) from time to time. However, braking with traditional norms is sometimes also caused when another major feature change causes a ripple of consequences in vehicle design. The recent drive toward battery electric vehicles (BEVs) is just that type of major change. Converting vehicles to BEV causes (and enables) significant changes to numerous components and system design considerations.

Thus, some changes may be driven by a need to evolve suspension designs to accommodate changes to other design features associated with BEV innovation to ensure that responsiveness to different driving conditions can be maintained for high degrees of driver confidence and enjoyment of the driving experience.

BRIEF SUMMARY OF SOME EXAMPLES

In accordance with an example embodiment, a vehicle suspension system may be provided. The vehicle suspension system may include a semi trailing arm, a coilover damper and a distributed jounce response assembly. The semi trailing arm may be operably coupled to a chassis of a battery electric vehicle (BEV) at a first pivotable connection and a second pivotable connection. The semi trailing arm may also support a rear wheel of the BEV. The coilover damper may be disposed between the chassis and a third pivotable connection on the semi trailing arm. The distributed jounce response assembly may progressively distribute a jounce load to at least two different locations within the system.

In another example embodiment, a distributed jounce response assembly for an independent rear suspension system operably coupling a chassis of a vehicle to a rear wheel of the vehicle may be provided. The distributed jounce response assembly may include an internal jounce bumper disposed internal to a coilover damper disposed between the chassis and a semi trailing arm operably coupled to the chassis at a first pivotable connection and a second pivotable connection, and an external jounce bumper disposed external to the coilover damper. The internal and external jounce bumpers may progressively distribute a jounce load to at least two different locations on the chassis and the semi trailing arm.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, BEV design changes may cause other innovations to be desirable in order to accommodate the BEV design changes, while maximizing efficiency and performance. One area in which recent changes may cause this effect relates to pickup truck design. After a relatively long period of absence from the marketplace, the rapid uptake of BEV pickup truck demand in the marketplace has taken off. Because BEVs employ a relatively large and heavy battery, design options for locating the battery may be somewhat restricted. With those restrictions, ripple effects may propagate through the rest of the vehicle design. For example, the electric motor for the rear wheels may be moved rearward to be proximate to the wheels. Packaging the electric motor, and enabling it to be mounted to the vehicle frame proximate to the rear wheels to permit the corresponding mass to be effectively sprung creates some rather unique space and structural adjustments to the area in which the rear suspension would normally be provided. To deal with these space considerations, example embodiments provide for the employment of an independent rear suspension on a pickup truck, a rarely seen design choice in and of itself. However, beyond merely employing an independent rear suspension, example embodiments may employ a semi trailing arm (STA) along with a coilover damper, a unique choice for implementation in a body on frame vehicle, much less a pickup truck.

As will be seen in connection with detailed discussions of an example embodiment below, the combination of an STA with a coilover damper in this context provides a number of advantages in performance. The combination also creates the opportunity to incorporate other unique features that further enhance various aspects of performance and robustness. Some of those additional features will be discussed in detail below.

Figure 1:
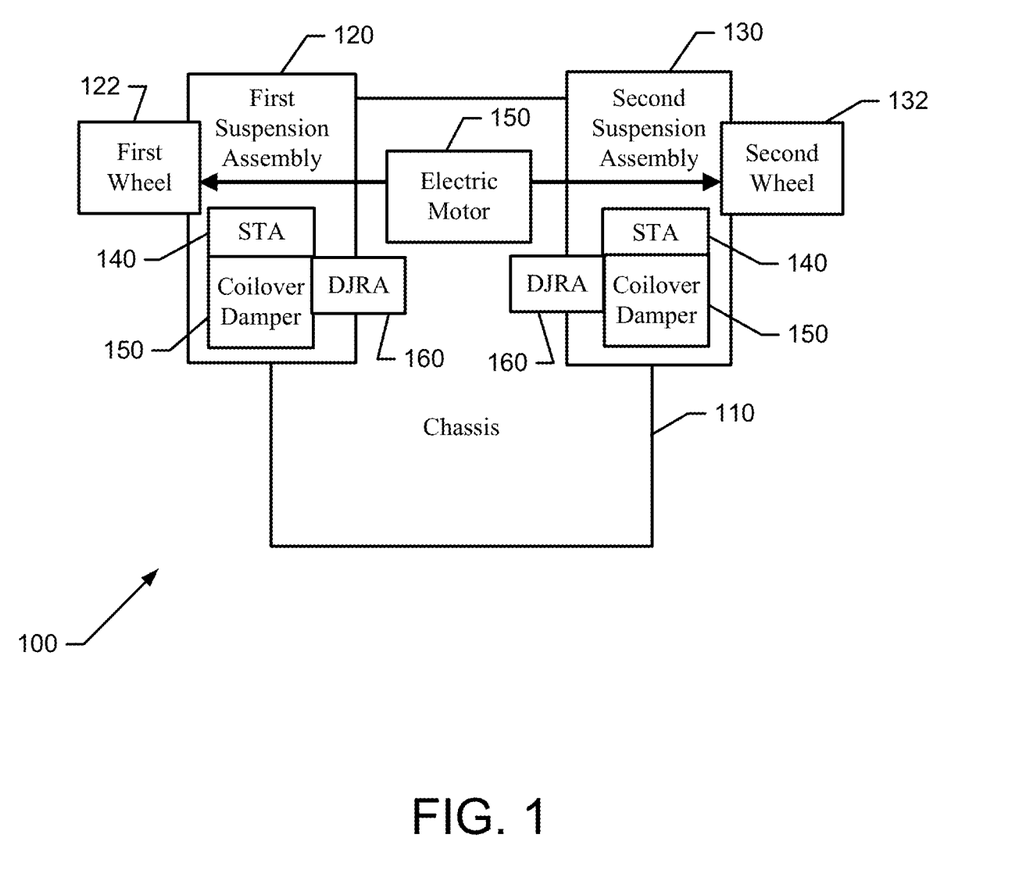
FIG. 1 illustrates a block diagram of a suspension system of a vehicle in accordance with an example embodiment.

FIG. 1 illustrates a block diagram of a vehicle suspension system 100 of an example embodiment. The vehicle suspension system 100 may include multiple components, subsystems or assemblies, which may be operably coupled (and in some cases affixed) to a chassis 110 of the vehicle. The vehicle suspension system 100 may include a first suspension assembly 120 that may support a first wheel 122, and a second suspension assembly 130 that may support a second wheel 132. In an example embodiment, the first and second wheels 122 and 132 may be rear wheels, and thus the first and second suspension assemblies 120 and 130, which are independent of each other, may be understood to be independent rear suspension assemblies for respective rear wheels of the vehicle.

The first and second suspension assemblies 120 and 130 may substantially mirror each other in arrangement and may form portions of the suspension system of an example embodiment. The first and second suspension assemblies 120 and 130 may take any suitable form and include components associated therewith. Thus, for example, the first and second suspension assemblies 120 and 130 may include shocks, springs, dampers, linkages and/or the like, in any of various arrangements that allow relative motion between the chassis 110 and the respective wheels (i.e. the first and second wheels 122 and 132). However, FIGS. 2-11 will demonstrate some specific examples of such components that may be employed in one example implementation.

As shown in FIG. 1, each of the first suspension assembly 120 and the second suspension assembly 130 may include a respective instance of a semi trailing arm (STA) 140, a coilover damper 150, and a distributed jounce response assembly (DJRA) 160. The STA 140 (of each of the first and second suspension assemblies 120 and 130) may be operably coupled to the coilover damper 150 and the distributed jounce response assembly 160 on its respective side of the vehicle. The STA 140, coilover damper 150 and distributed jounce response assembly 160 may cooperate to provide an architecture for support of the first and second wheels 122 and 132 that enhance performance and durability of the first and second suspension assemblies 120 and 130.

In an example embodiment, power to each of the first and second wheels 122 and 132 may be provided by an electric motor 150, which may be mounted to the chassis 110, and therefore be a sprung mass. In some cases, a single instance of the electric motor 150 may provide power to both the first and second wheels 122 and 132. However, in alternative embodiments, separate motors may power each respective one of the first and second wheels 122 and 132. The chassis 110 may be a ladder frame in some cases, with two longitudinally extending frame members, and any suitable number of transversely extending frame members that operably couple the two longitudinally extending frame members to each other. A body may be operably coupled to the chassis 110 to define a body on frame construction paradigm for the vehicle.

As noted above, it can be appreciated that the structures or components that are used to define the vehicle suspension system 100 can vary in different implementations of example embodiments. Thus, FIGS. 2-11 merely illustrate one non-limiting example of structures that may be employed in an example embodiment. Notably, several components that are not germane to the workings of components discussed herein may be removed, fully or partially, to facilitate better visibility to other components that are discussed herein.

Referring now to FIGS. 2-11, a first STA 200 and second STA 202 (each of which are examples of the STA 140 of FIG. 1) may be provided on opposite sides of the vehicle. In this example, the chassis 110 of FIG. 1 may include a first longitudinal frame member 210 on the same side of the vehicle as the first STA 200, and a second longitudinal frame member 212 on the same side of the vehicle as the second STA 202. Any suitable number of transverse frame members may extend between the first and second longitudinal frame members 210 and 212. However, at least a first transverse frame member 214 and second transverse frame member 216 may be included, and are shown, in this example embodiment. An electric motor 220 (an example of electric motor 150 of FIG. 1) may be operably coupled (e.g., via brackets or other mechanical coupling devices) to the first transverse frame member 214 at a front end of the electric motor 220, and to the second transverse frame member 216 at a rear end of the electric motor 220 (front and rear being relative to the normal direction of forward motion of the vehicle).

A first coilover damper 230 may be operably coupled to the first STA 200, and a second coilover damper 232 may be operably coupled to the second STA 202. The first and second coilover dampers 230 and 232 may be examples of the coilover dampers 150 of FIG. 1. Each of the first and second STAs 200 and 202, and the first and second coilover dampers 230 and 232 generally mirror each other in terms of construction and function. Thus, various individual components that are operably coupled to (or are portions of) each of the first and second STAs 200 and 202 and the first and second coilover dampers 230 and 232 will simply be described in reference to only one of the first or second STAs 200 or 202 or the first or second coilover dampers 230 or 232.

Each of the first and second STAs 200 and 202 may be operably coupled to the chassis at three points, each of which is a pivotable connection including a respective bushing and bolt. A first pivotable connection 240 of each of the first and second STAs 200 and 202 may operably couple the first STA 200 to the first longitudinal frame member 210, and operably couple the second STA 202 to the second longitudinal frame member 212. Although the operable coupling could be direct, in some cases, a bracket assembly may be welded or bolted to the first and second longitudinal frame members 210 and 212, respectively, and a bolt may pass through the bracket assembly to interface with a bushing that fits around the bolt to be received in a reception cavity formed at an end of a first arm 242 that extends (forward in this case) to the first pivotable connection 240.

A second pivotable connection 244 of each of the first and second STAs 200 and 202 may operably couple the first STA 200 to the first transverse frame member 214, and operably couple the second STA 202 to the first transverse frame member 214. Although the operable coupling could be direct, in some cases, a bracket assembly may be welded or bolted to the first transverse frame member 214, and a bolt may pass through the bracket assembly to interface with a bushing that fits around the bolt to be received in another reception cavity formed at an end of a second arm 246 that extends (forward and inward in this case) to the second pivotable connection 244.

Figure 2:
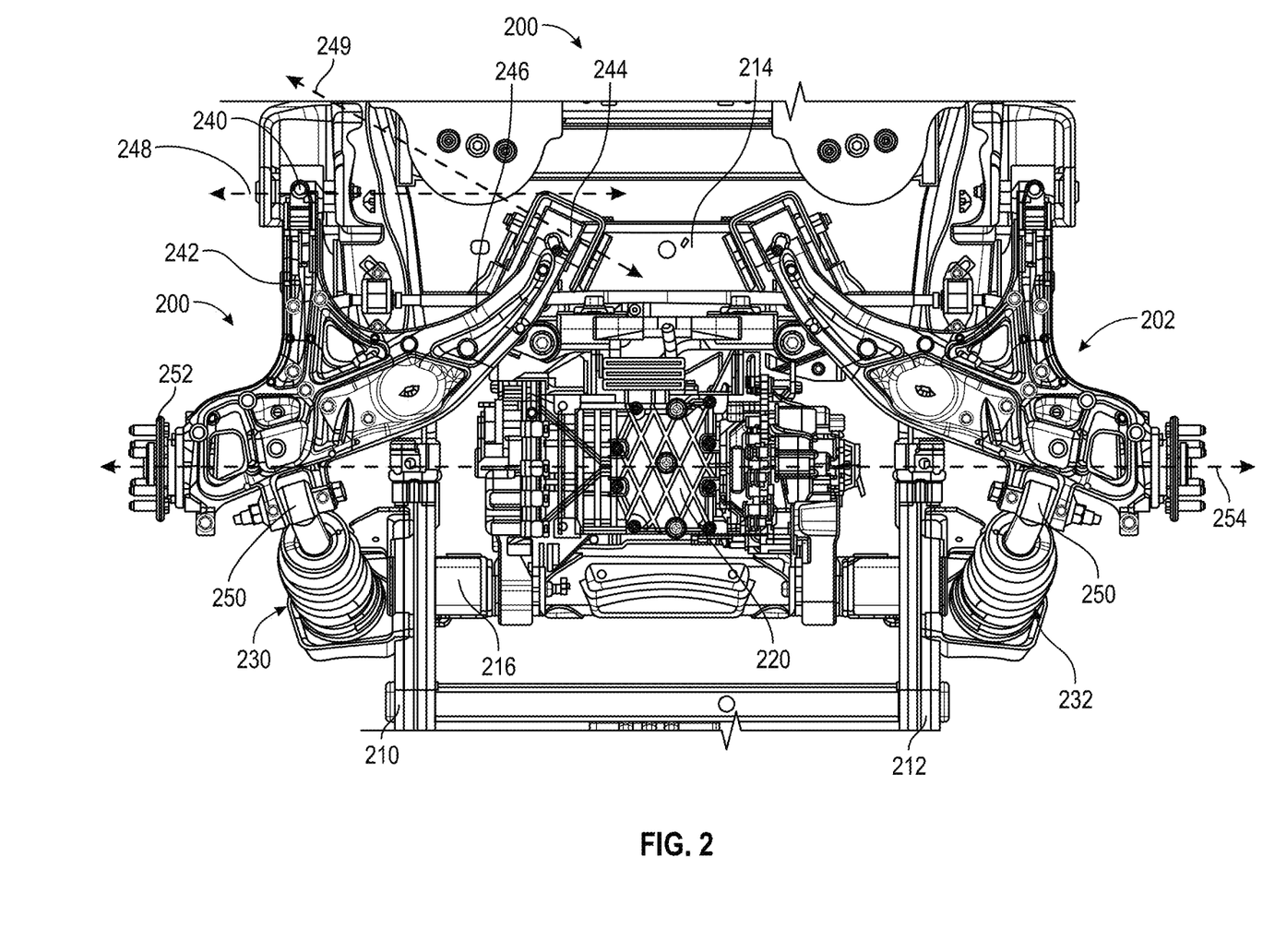
FIG. 2 illustrates a view from below a vehicle looking upward at various components of the suspension system in accordance with an example embodiment.
Figure 3:
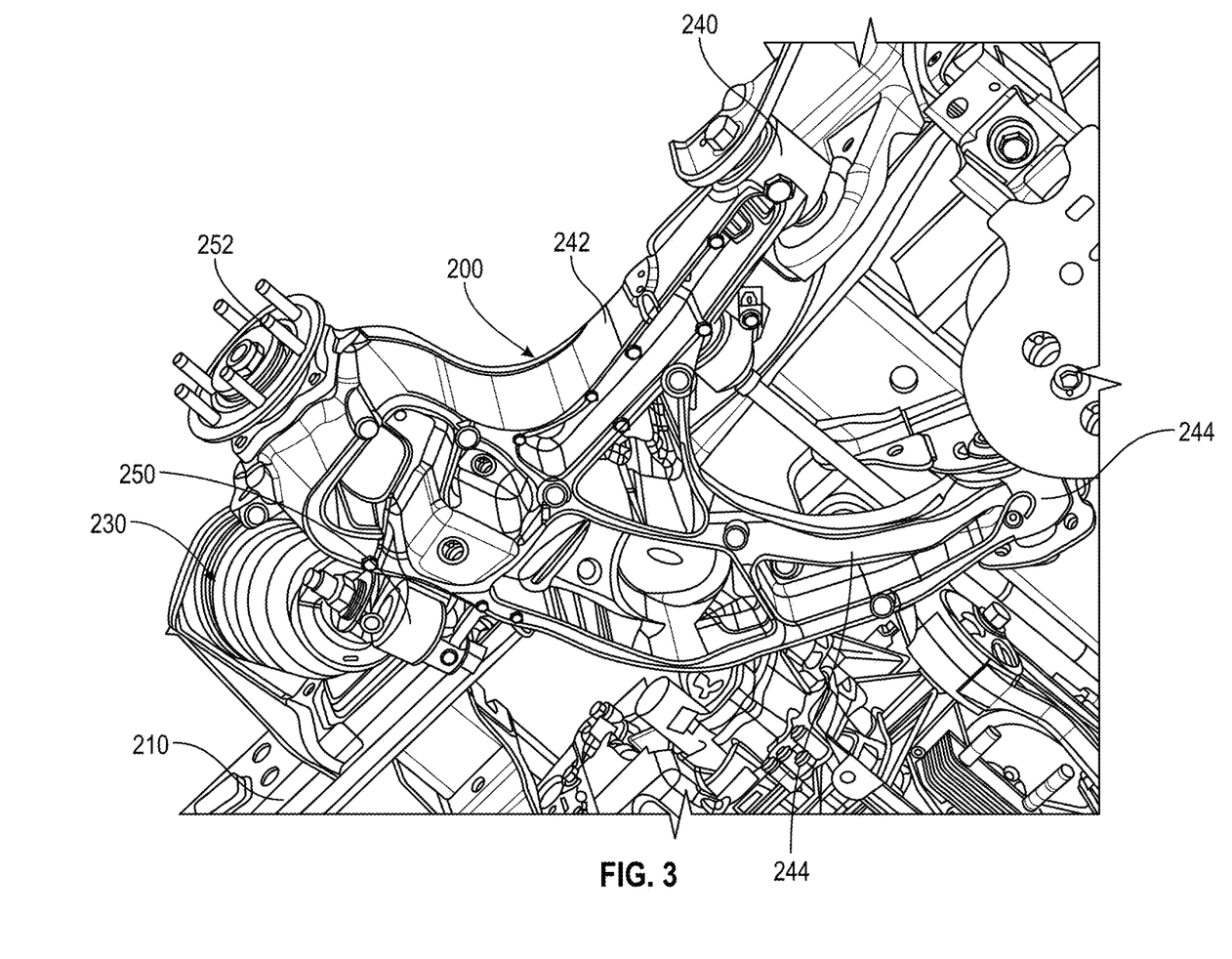
FIG. 3 illustrates a perspective view of one semi trailing arm of a suspension system in accordance with an example embodiment.

As can be seen in FIG. 2, a pivot axis 248 of the first pivotable connection 240 may be substantially perpendicular to a longitudinal axis of the vehicle (and therefore substantially parallel to an axis of rotation of the wheels). Meanwhile, a pivot axis 249 of the second pivotable connection 244 may form an acute angle relative to the pivot axis 248 of the first pivotable connection 240. This angular difference may, in some examples, be between about 10 degrees and about 30 degrees, and may assist in providing better understeer characteristics. In particular, the bushings may deflect more rearward and laterally due to the angular difference, which may provide better durability. Moreover, in an example embodiment, a cam bolt 245 of the second pivotable connection 244 may be provided to enable toe angle adjustment via the corresponding bushing of the second pivotable connection 244.

A third pivotable connection 250 may be formed proximate to an intersection between the first and second arms 242 and 246, on a rearward side of the first and second STAs 200 and 202. Meanwhile, a knuckle or wheel hub 252 may be operably coupled to each of the first and second STAs 200 and 202 at a distal end thereof (relative to the first and second pivotable connections 240 and 244). A wheel axis 254 may be formed about which each of the wheel hubs 252 rotate (and therefore also about which the wheels (e.g., the first and second wheels 122 and 132 of FIG. 1) rotate). As can be appreciated from FIG. 2, the first and second pivotable connections 240 and 244 are each forward of the wheel axis 254, and the third pivotable connection 250 is rearward of the wheel axis 254. Also, of note, each of the wheel hubs 252 is independently movable, so the wheel axis 254 is not necessarily common to both wheels and wheel hubs 252. Generally speaking, during steady state operation on a flat surface, it may be the case that the wheel axis 254 for each wheel is coaxial. However, if one wheel is deflected, the wheel axis 254 of the deflected wheel may move to eliminate the coaxial condition at least temporarily.

Whereas the first and second pivotable connections 240 and 244 are each pivotally attached to the chassis, and do not change position relative to the chassis, the third pivotable connection 250 actually moves in location up and down relative to the chassis. In this regard, the third pivotable connection 250 operably couples a distal end of a respective one of the first or second coilover dampers 230 or 232. Meanwhile, a proximal end of the respective one of the first or second coilover dampers 230 or 232 operably couples to a corresponding one of the first or second longitudinal frame members 210 or 212. Thus, when one of the wheels (and therefore the corresponding wheel hub 252) is displaced upwardly or downwardly due to encountering an object or pothole, the corresponding one of the first or second coilover dampers 230 or 232 will compress or rebound accordingly. The compression or rebound of the corresponding one of the first or second coilover dampers 230 or 232 will cause the first or second STA 200 or 202 to pivot about the pivot axes 248 and 249. The compression or rebound of the corresponding one of the first or second coilover dampers 230 or 232 will also cause the wheel hub 252 to be carried up or down, and the corresponding wheel axis 254 will also move up or down accordingly. The upward direction of possible movement is shown by arrow 260 in reference to FIG. 6 and represents compression. The downward direction of possible movement is shown by arrow 262 in reference to FIG. 6, and represents rebound.

A very rapid and/or large compression event may, in some cases, cause full compression of the first or second coilover dampers 230 or 232. Without other measures being taken, reaching full compression may cause a hard stop in motion of the wheel hub 252 to be reached, and this may be felt by the vehicle (and driver) as a rather harsh bump. To mitigate this type of harsh bump from being experienced, some vehicles (and particularly some shock absorbers or dampers) may employ a jounce bumper. However, as noted above in reference to FIG. 1, some example embodiments may employ the distributed jounce response assembly 160. The distributed jounce response assembly 160 may be embodied via two jounce bumpers that may be strategically located and designed to define a progressive response to large compression events. To achieve the aforementioned progressive response, the distributed jounce response assembly 160 may be embodied in an internal jounce bumper 270 and an external jounce bumper 271 that are at different locations, and that are engaged at different times.

The internal jounce bumper 270 may be considered to be "internal" due to the fact that the internal jounce bumper 270 is inside the first and second coilover dampers 230 and 232. Moreover, the internal jounce bumper 270 may typically not even be visible without removing other components. Meanwhile, the external jounce bumper 271 is considered to be "external" since the external jounce bumper is outside the first and second coilover dampers 230 and 232. The external jounce bumper 271 may therefore be visible without any need to remove other components.

In an example embodiment, the internal jounce bumper 270 may be disposed proximate to the proximal end of the first or second coilover damper 230 or 232. In this regard, each of the first and second coilover dampers 230 and 232 may include a damper portion and a coil spring portion. In some embodiments, the first and second coilover dampers 230 and 232 may include a piston rod 272, a damper tube 274, a bump cap 276 at the end of the damper tube 274 out of which the piston rod 272 extends, and a coil spring 278. The damper tube 274 and bump cap 276 may generally be disposed inside a dust cover 280 that is located inside the coil spring 278 to protect the damper tube 274 from invasion by debris. The piston rod 272 may be displaceable responsive to compression and rebound events relative to the damper tube 274 by moving upward or downward therein to alternately shorten or lengthen the first or second coilover damper 230 or 232 (and carry the wheel hub 252) while mitigating translation of such movement to the chassis. The coil spring 278 (of the coil spring portion) also resists compression and tension in opposing directions to assist the damper portion in responding to loads.

Thus, in a preferred situation, motion of the wheel hub 252 may be absorbed in the first or second coilover damper 230 or 232 to prevent (or reduce) corresponding motion of the chassis, and therefore maintain a smooth feeling ride for the driver and/or occupants of the vehicle. Moreover, the arrangement of the first and second coilover dampers 230 and 232 are such that each is arranged at an angle relative to a vertical plane 255 passing through the wheel axis 254. In particular, as the first and second coilover dampers 230 and 232 extend downward from a bracket or other contact point with the first and second longitudinal frame members 210 and 212, respectively, to a corresponding instance of the third pivotable connection 250, the angle is formed to extend forward at an acute angle relative to the vertical plane 255. The third pivotable connection 250 is also spaced apart (in the rearward direction) from the wheel axis 254. The location and orientation of the first and second coilover dampers 230 and 232 at a rear portion of the first and second STAs 200 and 202, respectively, provides a superior spring motion ratio that is greater than one. As a result, during a loading event, the distance the spring travels divided by the distance the wheel travels in the vertical direction is larger than one. This situation means that the shock absorber or damper is moving more than the wheel itself, which generally provides a smoother ride feel, and preferred response. The arrangement described above also increases control over changes in ride height based on how much weight the vehicle carries (e.g., between fully loaded and fully unloaded conditions). Moreover, assembly of the suspension system is also easier with the design shown and described above.

Nevertheless, responsive to a large compression event, the maximum possible travel of the piston rod 272 may be reached abruptly, as noted above. To mitigate any jarring event, the internal jounce bumper 270 may be made of a resilient material that, for example, when engaged by the bump cap 276 as the piston rod 272 approaches the end of its range of travel, provides some resistance to further compression of the piston rod 272. In this regard, the resilient material of the internal jounce bumper 270 may itself compress elastically to resist movement of the piston rod 272. Yet even this resistance has a limit, and a hard stop may still be reached. Thus, the external jounce bumper 271 may be provided to engage sometime after the internal jounce bumper 270 is engaged to provide a second level of resistance before full compression is reached. In an example embodiment, the internal jounce bumper 270 may be engaged (e.g., may physically contact the bump cap 276), and begin to compress, at least a few millimeters before the external jounce bumper 271 is engaged, and begins to compress.

The external jounce bumper 271 may be located proximate to a bumper landing pad 284 disposed on the second arm 246. In some embodiments, an instance of the external jounce bumper 271 may be operably coupled to each of the first and second longitudinal frame members 210 and 212. In this regard, the external jounce bumper 271 may be directly attached to an underside of the first or second longitudinal frame member 210 or 212, which is the side that faces the first or second STA 200 or 202. The external jounce bumper 271 may therefore be pointed directly downward to engage the bumper landing pad 284 when the first or second STA 200 or 202 pivots to the point at which the bumper landing pad 284 contacts the external jounce bumper 271. This provides the advantage of not only two locations for distribution of loads on the jounce bumpers, but also different angles over which the loads are distributed, and different parts of the first and second STAs 200 and 202 to which the loads are distributed. The external jounce bumper 271 may be made of a resilient material that, like the internal jounce bumper 270, may compress and absorb energy during such compression while resisting further motion of the first or second STA 200 or 202.

Figure 4:
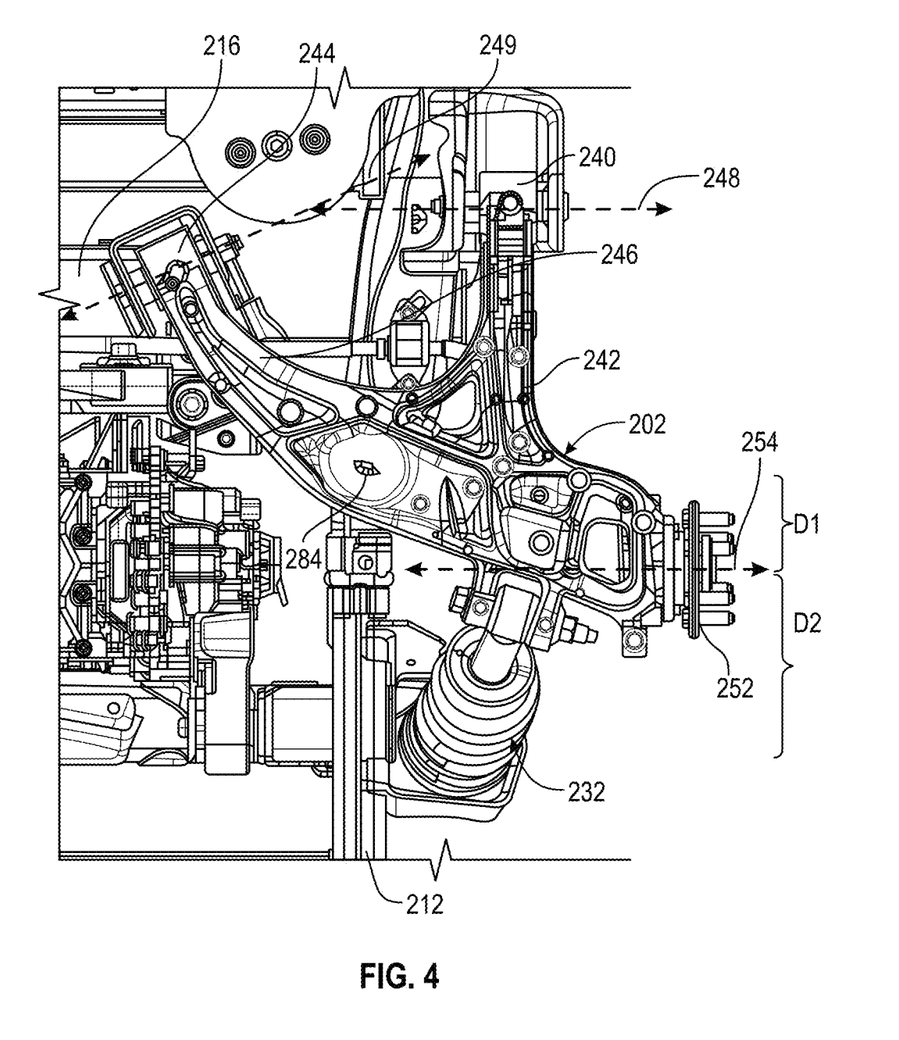
FIG. 4 illustrates a view from below a single one of the semi trailing arms in accordance with an example embodiment.
Figure 5:
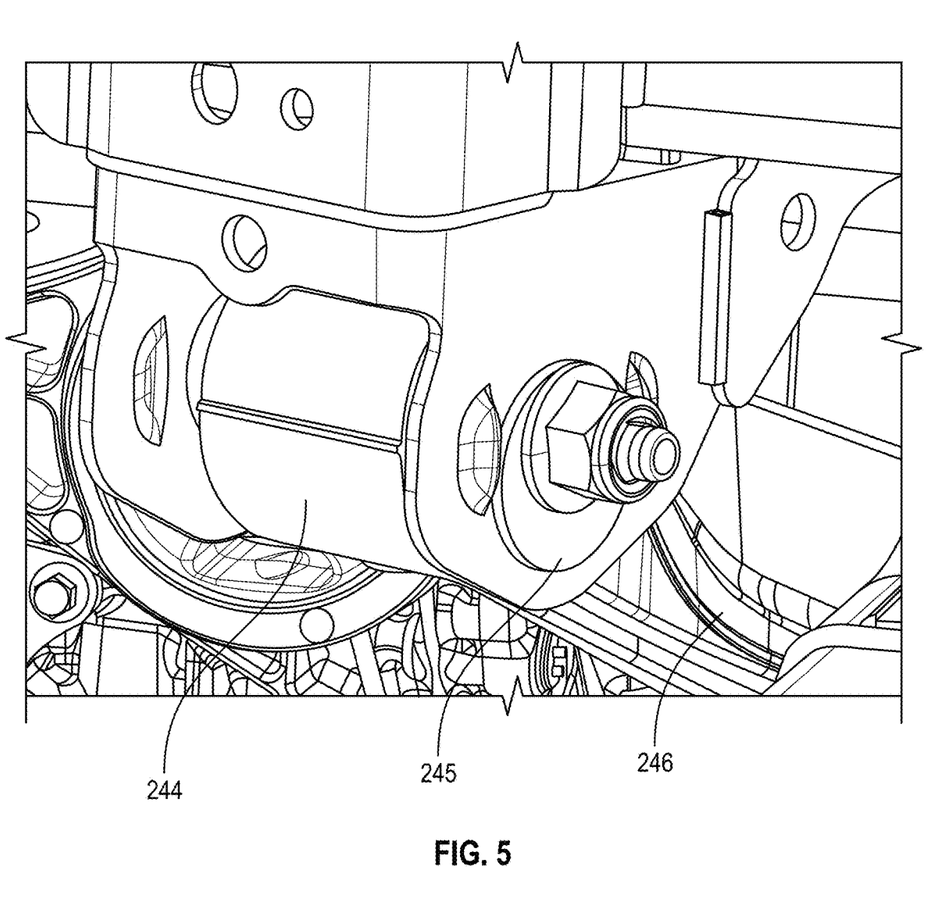
FIG. 5 illustrates a second pivotable connection in accordance with an example embodiment.
Figure 6:
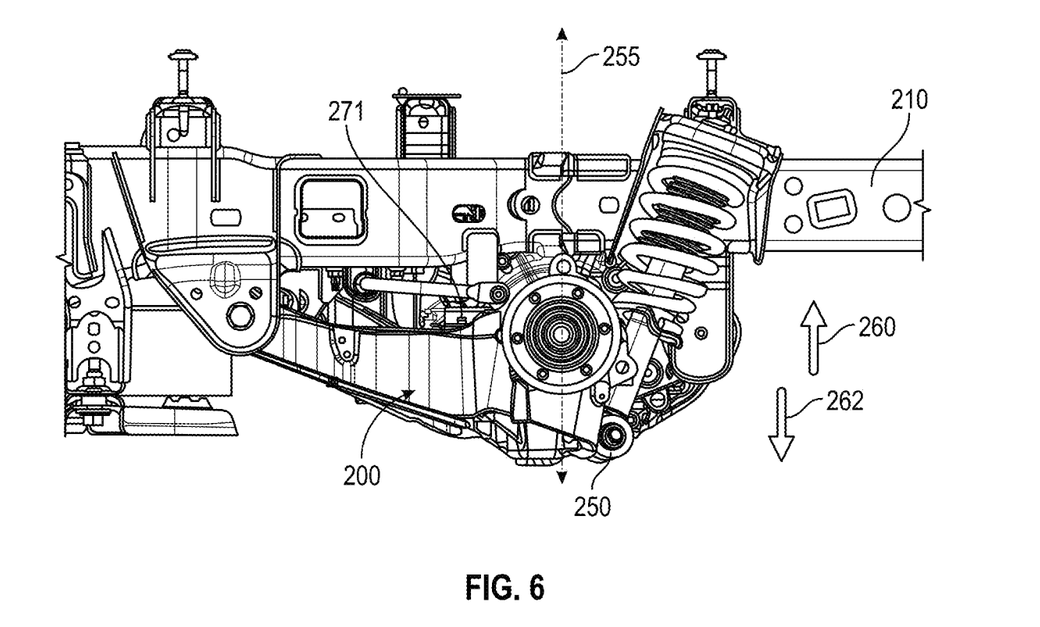
FIG. 6 is a side view of portions of the suspension system in accordance with an example embodiment.
Figure 7:
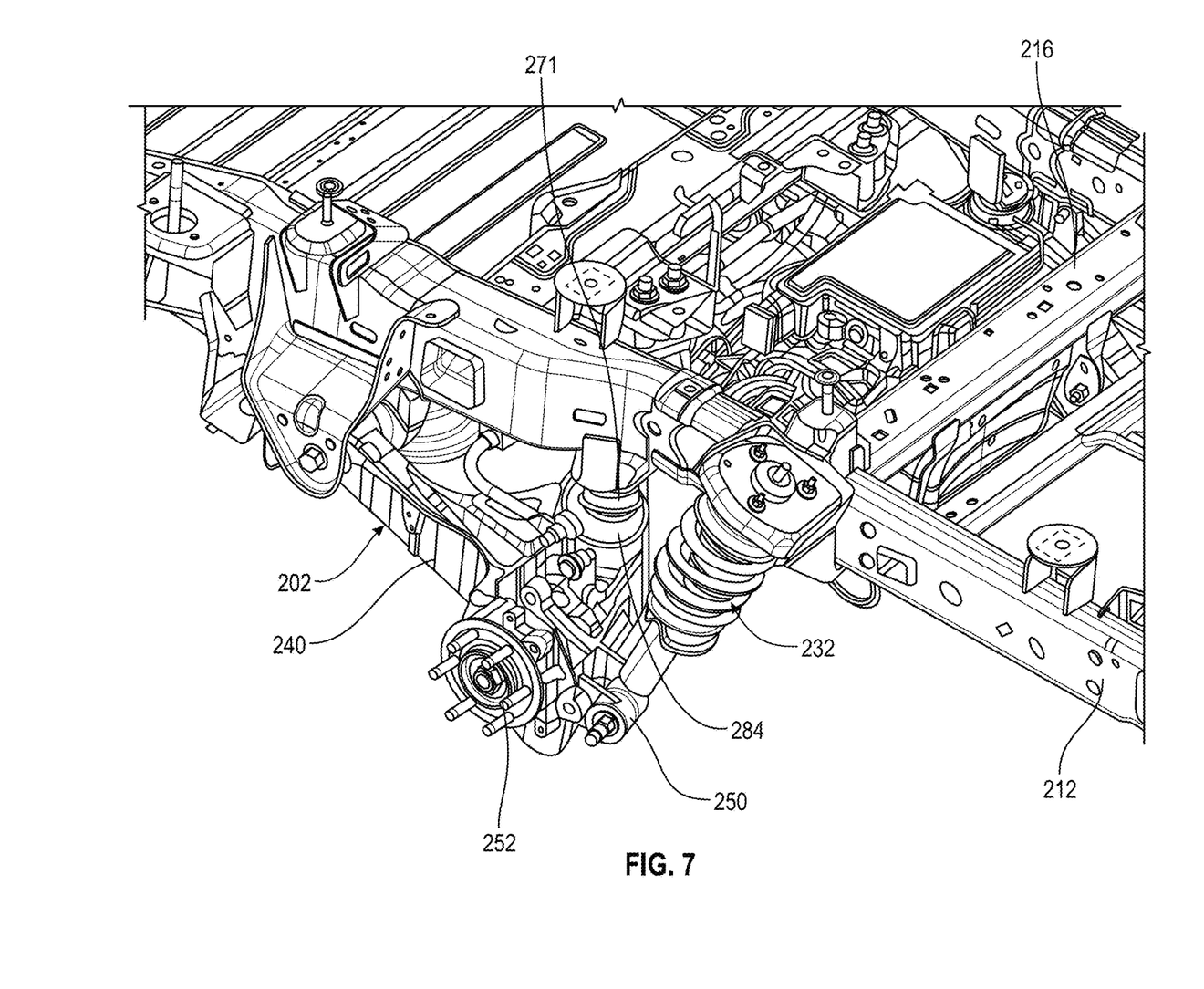
FIG. 7 is a perspective view looking downward on a coilover damper and external jounce bumper in accordance with an example embodiment.
Figure 8:
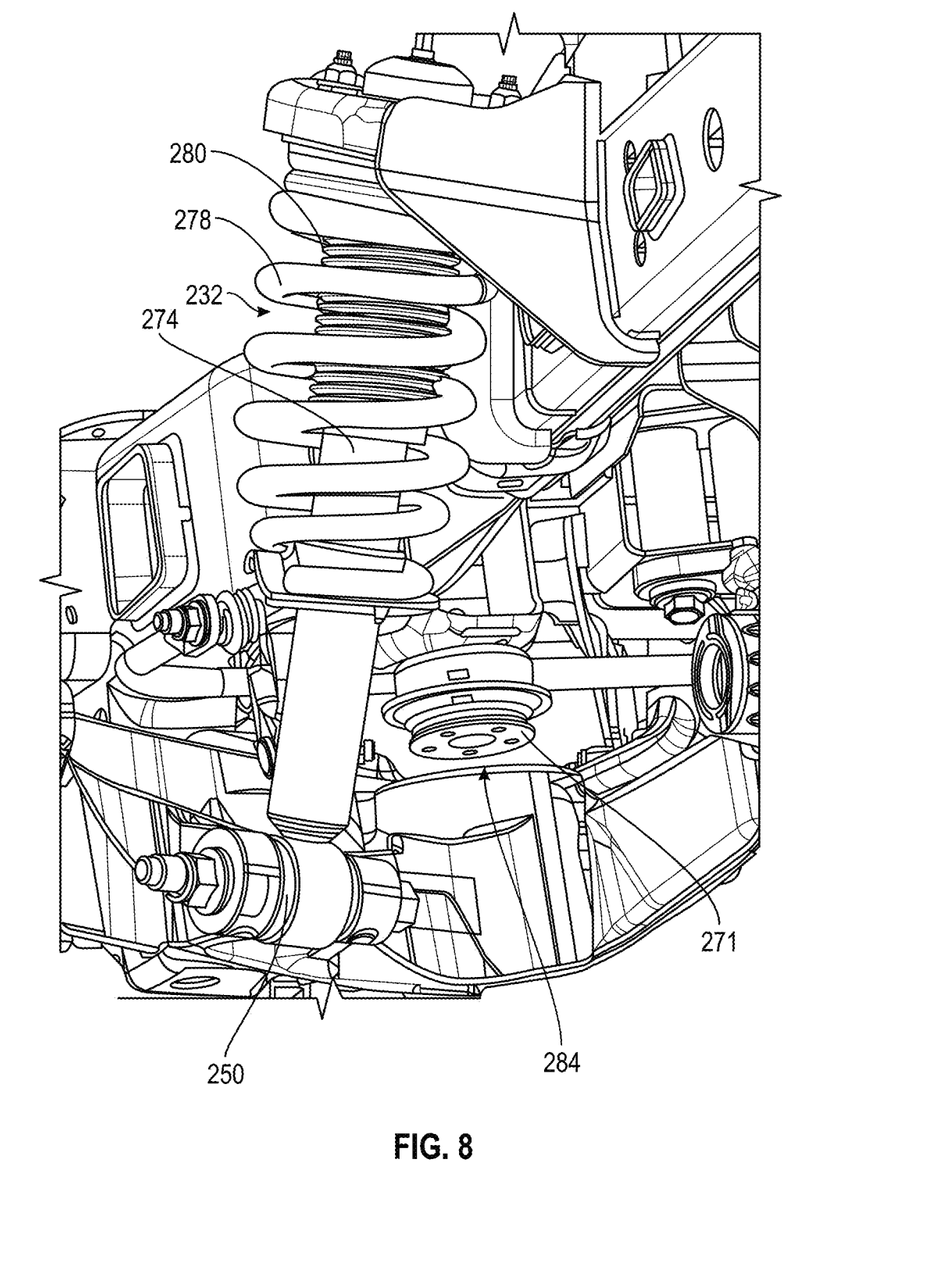
FIG. 8 is a perspective view of the coilover damper and external jounce bumper from another angle in accordance with an example embodiment.
Figure 9:
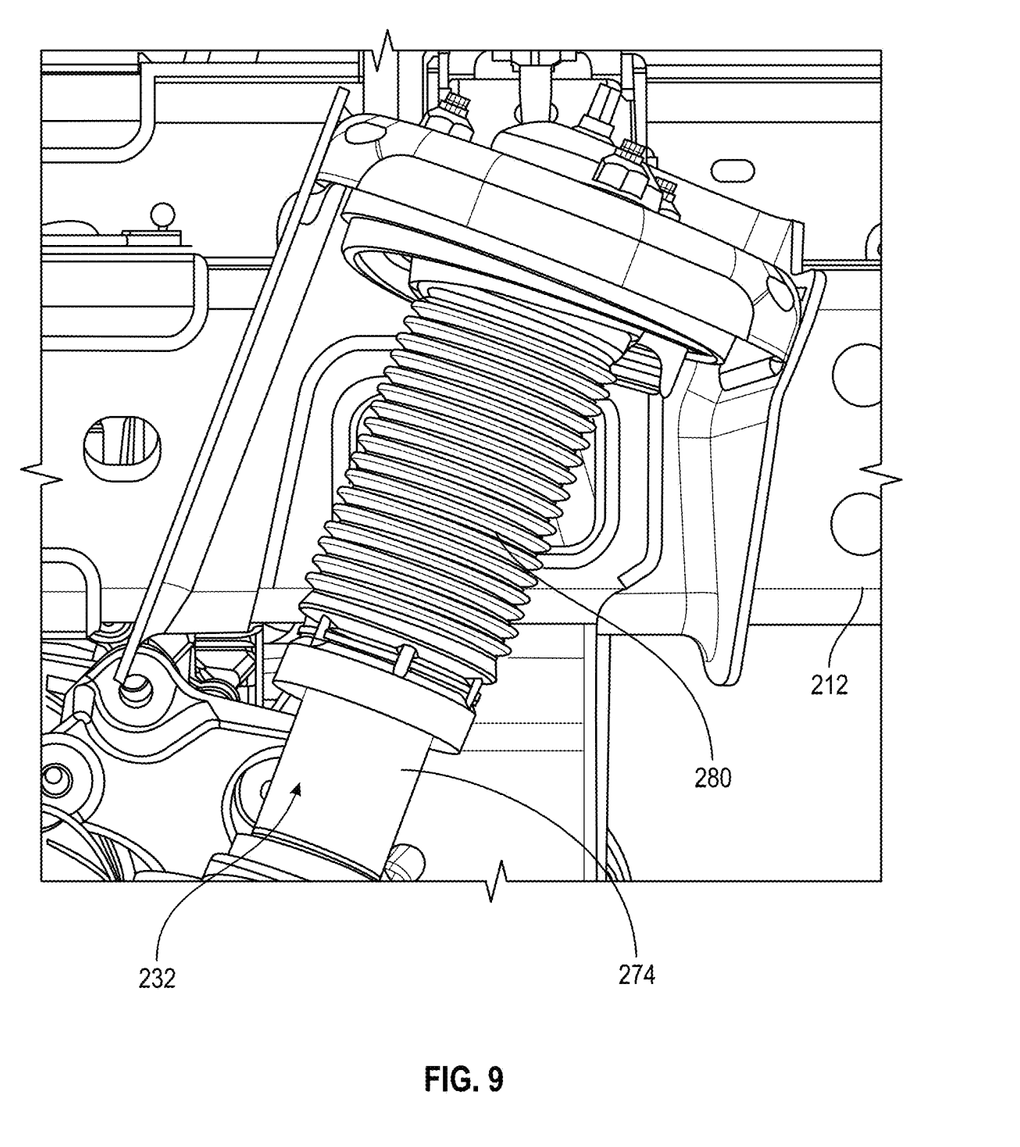
FIG. 9 is a side view of a coilover damper with the coil spring removed to expose internal components thereof in accordance with an example embodiment.
Figure 10:
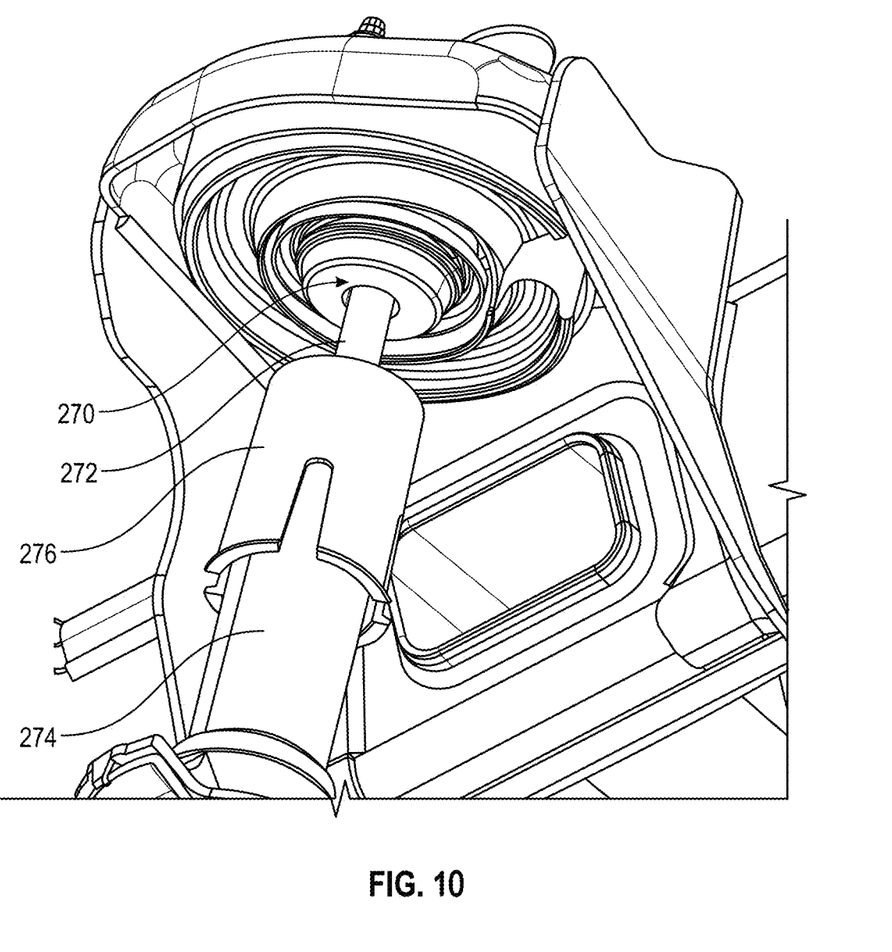
FIG. 10 is a perspective view of the coilover damper with the dust boot or cover removed to expose an internal jounce bumper in accordance with an example embodiment.
Figure 11:
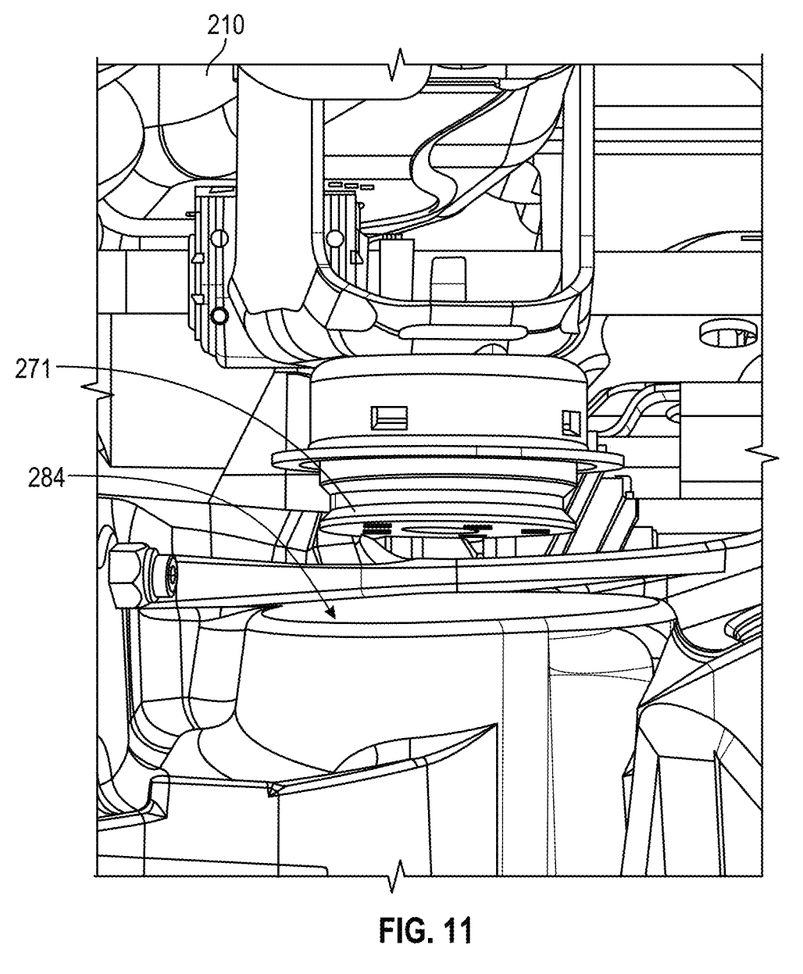
FIG. 11 is a side view of an external jounce bumper in accordance with an example embodiment.

The bumper landing pad 284 may be disposed at a portion of the second arm 246 that is proximate the first or second longitudinal frame member 210 or 212. The bumper landing pad 284 may be a flat surface formed on the second arm 246 to engage the external jounce bumper 271 as described above. In some examples, the bumper landing pad 284 may be located at about a midway point along a length of the second arm 246. However, although positioned near the midway point along the length of the second arm 246, the curvature of the second arm 246 may be such that the bumper landing pad 284 is closer to the wheel axis 254 than to the pivot axis 249. Moreover, as shown in FIG. 4, a first lateral distance (D1) from the bumper landing pad 284 to the wheel axis 254 may be smaller than a second lateral distance (D2) from the internal jounce bumper 270 to the wheel axis 254. This architecture places the external jounce bumper 271 closer to the wheel axis 254 than the internal jounce bumper 270.

Given that the external jounce bumper 271 is engaged second during any extreme compression event, it can be assumed that any compression event sufficient to fully engage both the internal jounce bumper 270 and the external jounce bumper 271 may impart a relatively large load. Distribution of such load between two points (i.e., the internal jounce bumper 270 and the external jounce bumper 271) is already an advantage in and of itself. However, for a load large enough to engage both jounce bumpers, the provision of one jounce bumper on each side of the wheel axis 254 provides some balance to the distribution of the load. Meanwhile, the provision of the external jounce bumper 271 (i.e., the one that engages second) closer to the wheel axis 254, and the positioning of the external jounce bumper 271 to be compressed in a direction perpendicular to the first or second longitudinal frame member 210 or 212 may create a more efficient absorption of loads large enough to fully engage both jounce bumpers by the external jounce bumper 271 before transmission to the frame. Accordingly, the distributed jounce response assembly 160 may be embodied both as a progressively acting jounce bumper assembly, but also as one that distributes forces on opposing sides of the wheel axis 254 for better balance and efficiency in load mitigation.

Example embodiments may therefore provide more efficient absorption of jounce loads, better distribution of such loads, and will enhance the durability of the jounce bumpers, the dampers and the STAs.

A vehicle suspension system for improving vehicle suspension may therefore be provided. The vehicle suspension system may include a semi trailing arm, a coilover damper and a distributed jounce response assembly. The semi trailing arm may be operably coupled to a chassis of a battery electric vehicle (BEV) at a first pivotable connection and a second pivotable connection. The semi trailing arm may also support a rear wheel of the BEV. The coilover damper may be disposed between the chassis and a third pivotable connection on the semi trailing arm. The distributed jounce response assembly may progressively distribute a jounce load to at least two different locations within the system.

The suspension system of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the chassis may include a first longitudinal frame member, a second longitudinal frame member, and at least a first transverse frame member extending between the first and second longitudinal frame members, and a second transverse frame member extending between the first and second longitudinal frame members. The first pivotable connection may operably couple a first arm of the semi trailing arm to the first longitudinal frame member. The second pivotable connection may operably couple a second arm of the semi trailing arm to the first transverse frame member. In an example embodiment, an electric motor may be mounted between the first and second longitudinal frame members and between the first and second transverse frame members to power the rear wheel and a second rear wheel. The system may further include a second semi trailing arm supporting the second rear wheel, and the electric motor may be disposed between the semi trailing arm and the second semi trailing arm. In some cases, the first pivotable connection may include a first pivot axis that is substantially perpendicular to a direction of extension of the first longitudinal frame member, and the second pivotable connection may include a second pivot axis that extends at an acute angle relative to the first pivot axis. In an example embodiment, the distributed jounce response assembly may include an internal jounce bumper in the coilover damper, and an external jounce bumper outside the coilover damper. In some cases, the internal jounce bumper may begin to be compressed in response to the jounce load before the external jounce bumper begins to be compressed. In an example embodiment, the coilover damper may extend between the third pivotable connection and the first longitudinal frame member to form an acute angle relative to a vertical plane through a wheel axis of the rear wheel, and the external jounce bumper may extend perpendicular to the first longitudinal frame member to engage a bumper landing pad disposed on the second arm of the semi trailing arm responsive to the jounce load. In some cases, the bumper landing pad may be disposed at a portion of the second arm that is closer to the wheel axis than to the first and second pivotable connections. In an example embodiment, the external jounce bumper may be disposed forward of a wheel axis of the rear wheel and the internal jounce bumper is disposed rearward of the wheel axis. In some cases, the external jounce bumper may be closer to the wheel axis than the internal jounce bumper. In an example embodiment, the distributed jounce response assembly may distribute the jounce load between two different points on the chassis and the semi trailing arm, and a direction of application of each portion of the jounce load at the two different points may be different. In some cases, the third connection point may be disposed at a rear end of the semi trailing arm proximate to an intersection of the first and second arms. In an example embodiment, the BEV may be a pickup truck, and the suspension system may include an independent rear suspension disposed proximate to a bed of the pickup truck. In some cases, the BEV may be a body on frame vehicle. In an example embodiment, the coilover damper may provide a spring motion ratio greater than one.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle suspension system comprising:
   a semi trailing arm operably coupled to a chassis of a battery electric vehicle (BEV) at a first pivotable connection and a second pivotable connection, the semi trailing arm supporting a rear wheel of the BEV;
   a coilover damper disposed between the chassis and a third pivotable connection on the semi trailing arm; and
   a distributed jounce response assembly that progressively distributes a jounce load to at least two different locations within the system.

2. The system of claim 1, wherein the chassis comprises a first longitudinal frame member, a second longitudinal frame member, and at least a first transverse frame member extending between the first and second longitudinal frame members, and a second transverse frame member extending between the first and second longitudinal frame members, and
   wherein the first pivotable connection operably couples a first arm of the semi trailing arm to the first longitudinal frame member, and the second pivotable connection operably couples a second arm of the semi trailing arm to the first transverse frame member.

3. The system of claim 2, wherein an electric motor is mounted between the first and second longitudinal frame members and between the first and second transverse frame members to power the rear wheel and a second rear wheel,
   wherein the system further comprises a second semi trailing arm supporting the second rear wheel, and
   wherein the electric motor is disposed between the semi trailing arm and the second semi trailing arm.

4. The system of claim 2, wherein the first pivotable connection comprises a first pivot axis that is substantially perpendicular to a direction of extension of the first longitudinal frame member, and
   wherein the second pivotable connection comprises a second pivot axis that extends at an acute angle relative to the first pivot axis.

5. The system of claim 2, wherein the distributed jounce response assembly comprises an internal jounce bumper in the coilover damper, and an external jounce bumper outside the coilover damper.

6. The system of claim 5, wherein the internal jounce bumper begins to be compressed in response to the jounce load before the external jounce bumper begins to be compressed.

7. The system of claim 5, wherein the coilover damper extends between the third pivotable connection and the first longitudinal frame member to form an acute angle relative to a vertical plane through a wheel axis of the rear wheel, and wherein the external jounce bumper extends perpendicular to the first longitudinal frame member to engage a bumper landing pad disposed on the second arm of the semi trailing arm responsive to the jounce load.

8. The system of claim 7, wherein the bumper landing pad is disposed at a portion of the second arm that is closer to the wheel axis than to the first and second pivotable connections.

9. The system of claim 5, wherein the external jounce bumper is disposed forward of a wheel axis of the rear wheel and the internal jounce bumper is disposed rearward of the wheel axis.

10. The system of claim 9, wherein the external jounce bumper is closer to the wheel axis than the internal jounce bumper.

11. The system of claim 1, wherein the distributed jounce response assembly distributes the jounce load between two different points on the chassis and the semi trailing arm, and wherein a direction of application of each portion of the jounce load at the two different points is different.

12. The system of claim 1, wherein the third pivotable connection is disposed at a rear end of the semi trailing arm proximate to an intersection of the first and second arms.

13. The system of claim 1, wherein the BEV is a pickup truck, and the suspension system comprises an independent rear suspension disposed proximate to a bed of the pickup truck.

14. The system of claim 1, wherein the BEV is a body on frame vehicle.

15. The system of claim 1, wherein the coilover damper provides a spring motion ratio greater than one.

16. A distributed jounce response assembly for an independent rear suspension system operably coupling a chassis of a vehicle to a rear wheel of the vehicle, the distributed jounce response assembly comprising:
 an internal jounce bumper disposed internal to a coilover damper disposed between the chassis and a semi trailing arm operably coupled to the chassis at a first pivotable connection and a second pivotable connection; and
 an external jounce bumper disposed external to the coilover damper,
 wherein the internal and external jounce bumpers progressively distribute a jounce load to at least two different locations on the chassis and the semi trailing arm.

17. The assembly of claim 16, wherein the internal jounce bumper begins to be compressed in response to the jounce load before the external jounce bumper begins to be compressed.

18. The assembly of claim 16, wherein the external jounce bumper is disposed forward of a wheel axis of the rear wheel and the internal jounce bumper is disposed rearward of the wheel axis.

19. The assembly of claim 18, wherein the external jounce bumper is closer to the wheel axis than the internal jounce bumper.

20. The assembly of claim 16, wherein a direction of application of each portion of the jounce load at the at least two different locations is different.

* * * * *